W. R. ROBERTS.
SIGNAL FOR AUTOMOBILES.
APPLICATION FILED SEPT. 30, 1916.

1,274,785.

Patented Aug. 6, 1918.
2 SHEETS—SHEET 1.

Wilbert R. Roberts,
INVENTOR

By George J. Oltsch
ATTORNEY.

W. R. ROBERTS.
SIGNAL FOR AUTOMOBILES.
APPLICATION FILED SEPT. 30, 1916.

1,274,785.

Patented Aug. 6, 1918.
2 SHEETS—SHEET 2.

Wilbert R. Roberts,
INVENTOR

By George J. Oltsch

ATTORNEY

UNITED STATES PATENT OFFICE.

WILBERT R. ROBERTS, OF SOUTH BEND, INDIANA, ASSIGNOR OF ONE-HALF TO FRANK M. SHAFER, OF SOUTH BEND, INDIANA.

SIGNAL FOR AUTOMOBILES.

1,274,785.

Specification of Letters Patent.

Patented Aug. 6, 1918.

Application filed September 30, 1916. Serial No. 123,018.

*To all whom it may concern:*

Be it known that I, WILBERT R. ROBERTS, a citizen of the United States, residing at South Bend, in the county of St. Joseph and State of Indiana, have invented certain new and useful Improvements in Signals for Automobiles, of which the following is a specification.

The invention relates to an improvement in signals for automobiles and similar vehicles, in the use of which the driver may indicate to an approaching or following vehicle that he intends to turn, and the direction of such turn.

Many municipalities require the driver or some one in the vehicle to indicate by outstretched arm the fact that the vehicle is about to turn, and the present invention is directed to a construction simulating such required action by the vehicle occupant.

The invention generally stated, comprises elongated signal arms, preferably with illuminating means for night signaling, arranged adjacent opposite sides of the cowl, either of which may be operated at the will of the driver to be projected at right angles to the vehicle, and to thereby indicate a contemplated turn of the vehicle, and the direction of such turn.

For signaling at night, each signal arm is provided with an illuminating means, preferably an electric bulb, and the circuit for energizing the same is automatically governed by the movement of the arm to signaling position, so that the particular arm operated is illuminated only immediately preceding and while in signaling position.

The invention in the preferred form of details will be described in the following specification, reference being had particularly to the accompanying drawings, in which:—

Figure 1:
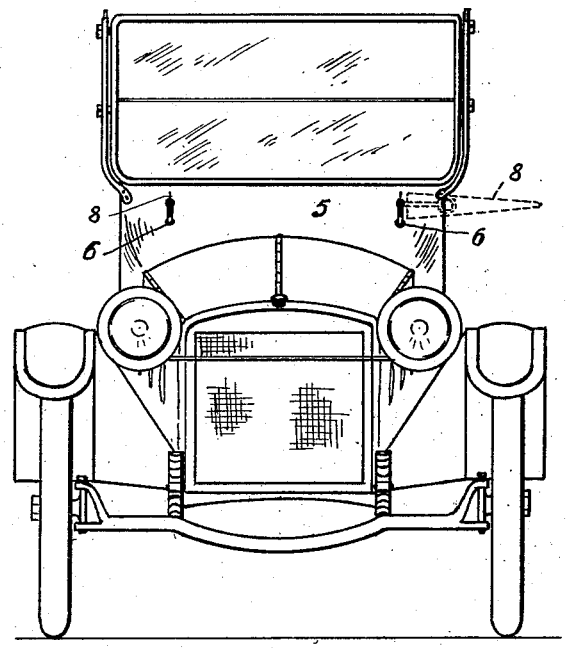
Figure 1 is a view in elevation, illustrating the improved signals applied, one of the signals being shown in signaling positions in dotted lines.
Figure 2:
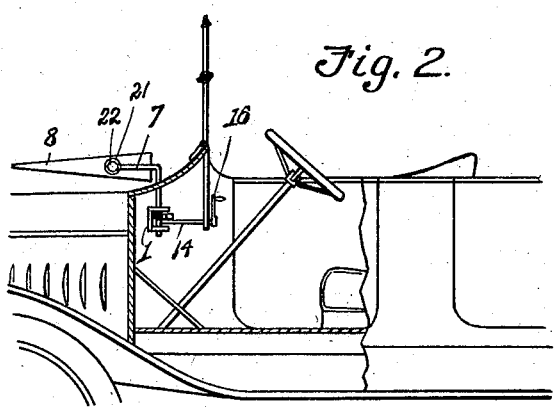
Fig. 2 is a side elevation partly in section of the same.
Figure 6:
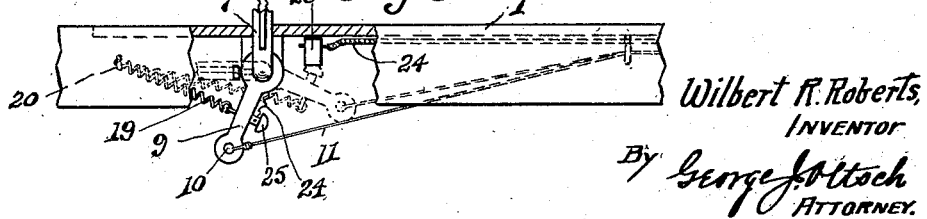
Fig. 6 is a broken plan illustrating particularly the switch connection.
Figure 3:
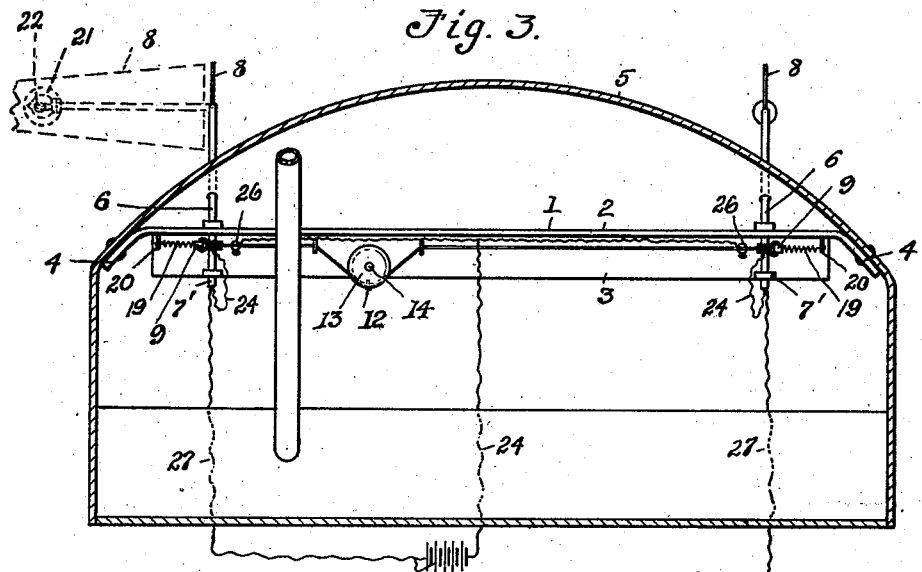
Fig. 3 is an enlarged sectional view partly in elevation, illustrating the mounting of the signals.
Figure 4:
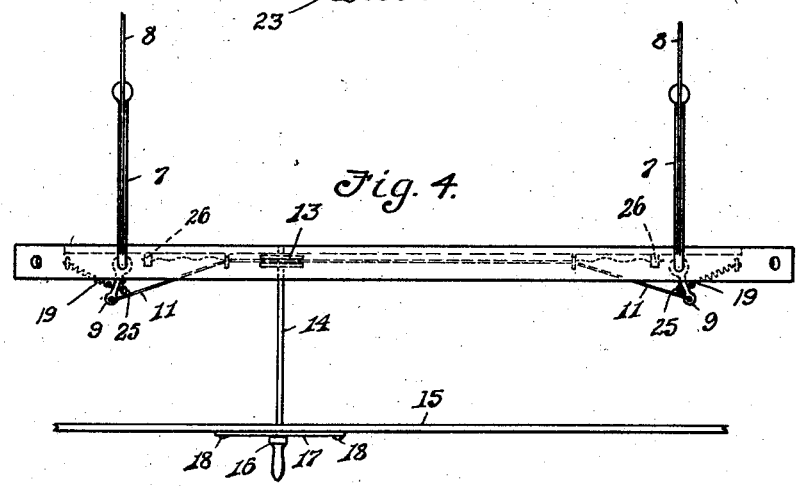
Fig. 4 is a plan of the supporting member for the operating parts, with such parts in position.
Figure 5:
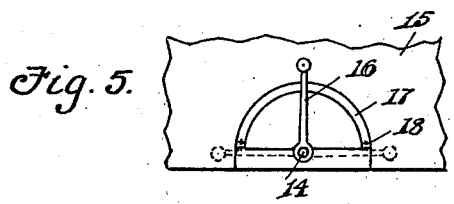
Fig. 5 is a broken elevation showing the manually operable member for the signals.

The present invention is designed for use, without requiring change in the structure of the present automobile, for such purpose I provide a support for the signals and operating parts which may be readily applied to practically any automobile.

The support comprises a frame bar 1, having a horizontal ledge 2, and a vertical ledge 3, depending from the relatively forward edge of the horizontal ledge. The terminals of the horizontal ledge, which extend beyond the ends of the vertical ledge, are formed as at 4, to present angularly related portions, to bear against the cowl 5, and beneath the same, being secured in place by any appropriate means. The support 1 is designed to carry the operating parts, and being thus housed within the cowl, in front of the instrument board, is entirely concealed from view, though readily accessible when necessary to adjust or replace any of the parts of the mechanism. Rotatably mounted in the support, adjacent each end thereof, is the vertical portion 6, of the signal supporting shaft. This portion of the shaft is rotatably mounted in a horizontal ledge 2 of the support, and in a bearing block 7' projecting forwardly from the vertical ledge near the lower edge of the latter. The portions 6 of the respective shafts are of sufficient length to extend to and through the cowl, projecting a slight distance above the same, and being there formed to provide forwardly projecting or right angled sections 7.

The signals proper, preferably in the form of triangular shaped blades 8, are secured at their base portions to the horizontal sections 7 of the shaft, so that said signals are rotated in a horizontal plane on movement of the shaft. The respective shafts are so located adjacent the side portions of the cowl that the signals, when in inoperative positions, may extend directly forward, and when in operative position, may project laterally, extending a sufficient distance beyond the sides of the car to be clearly visible from in front or rear of the car.

Adjustably secured upon the portions 6 of each operating shaft, immediately below the horizontal ledge of the support, is an operating arm 9, the free terminal of which is formed with an eye 10, to receive a cord or cable 11. The opposite terminals of the cables 11 are connected to a similar point 12 on the periphery of a circumferentially grooved disk 13, secured upon one end of a hand shaft 14, which is mounted in the support and in the instrument board 15 of the vehicle. In front of the instrument board the hand shaft 14 is provided with a handle 16, moving over a quadrant 17, with said quadrant, or the handle, or both, formed in any appropriate manner, indicated at 18, whereby the handle may be held in either of three positions. In the upright position the handle holds the signals in an inoperative position, while in moving the handle from such upright position in either direction, the particular cable drawn upon will set its connected signal to an operative position, the remaining signal, by reason of the flexibility of its cable remaining inactive. A spring 19 connects each arm 9 to a pin 20, depending from the support, the springs acting in opposition to the cables, and serving to return the signals to normal positions upon release of the handle from a set or operative position.

The signals are designed for use at night, under which circumstances the blades 8 are formed with openings 21, and the operating shafts, which are hollow, terminate at the openings and are provided with sockets for the reception of electric bulbs 22. The respective bulbs are in parallel circuit from a source of energy 23, the respective conductors of either circuit including an automatic switch. Such conductor, indicated at 24, leading from the bulb through the operating shaft and being terminally connected to a lug or headed pin 25, projecting from the arm 9. Secured upon the support 1, in proper relation to be engaged by the contact 25, when the signal has been moved to an operative position, is a contact block 26, to which the remaining section of the conductor 24, leading from the battery, is connected. The block 26 is of course insulated from the support, and the remaining conductor 27 of this circuit, leads directly from the battery to the bulb. The illuminating means of a particular signal is thus energized only as such signal is moved to an operative position, it of course being understood that the circuits as an entirety, may be broken by a simple switch (not shown), for daylight running.

The signals are thus operated from a position convenient to the driver, who, through suitable manipulation of the handle, may set a signal to indicate to anyone interested the fact that the vehicle is going to turn and the direction of such turn, the parts when set remaining set until released by the driver. Under these circumstances, following the setting of the signal, which may be instantly done, the driver's full attention may be directed to the control of the vehicle.

Having described my invention, what I claim and desire to secure by Letters Patent is:—

1. A signal for automobiles or the like, comprising a support secured to the cowl, shafts mounted in the support and projecting through the cowl, signal blades carried by the shafts, arms secured to the shafts adjacent the support, an operating disk rotatably mounted upon the support, and connections between the respective arms and disk, said connections being flexible and connected to the same point on the disk to operate but one signal in the movement of the disk in one direction.

2. A signal for automobiles or the like, comprising a support secured to the cowl, shafts mounted in the support and projecting through the cowl, signal blades carried by the shafts, arms secured to the shafts adjacent the support, an operating disk rotatably mounted upon the support, and connections between the respective arms and disk, said connections being flexible and connected to the same point on the disk to operate but one signal in the movement of the disk in one direction, and springs connected to the arms acting in opposition to the flexible connection.

In testimony whereof I affix my signature in presence of two witnesses.

WILBERT R. ROBERTS.

Witnesses:
GEORGE J. OLTSCH,
AGNES GORDON.

Copies of this patent may be obtained for five cents each, by addressing the "Commissioner of Patents, Washington, D. C."